United States Patent
Neven et al.

(10) Patent No.: US 11,861,466 B1
(45) Date of Patent: **\*Jan. 2, 2024**

(54) MULTI-MACHINE DISTRIBUTED LEARNING SYSTEMS

(71) Applicant: Google LLC, Mountain View, CA (US)

(72) Inventors: Hartmut Neven, Malibu, CA (US);
Nan Ding, Los Angeles, CA (US);
Vasil S. Denchev, West Lafayette, IN (US)

(73) Assignee: Google LLC, Mountain View, CA (US)

( * ) Notice: Subject to any disclaimer, the term of this patent is extended or adjusted under 35 U.S.C. 154(b) by 898 days.

This patent is subject to a terminal disclaimer.

(21) Appl. No.: 16/719,881

(22) Filed: Dec. 18, 2019

Related U.S. Application Data

(63) Continuation of application No. 14/694,762, filed on Apr. 23, 2015, now Pat. No. 10,558,932.

(60) Provisional application No. 61/983,111, filed on Apr. 23, 2014.

(51) Int. Cl.
*G06N 20/00* (2019.01)
*G06N 10/00* (2022.01)
*G06F 17/16* (2006.01)

(52) U.S. Cl.
CPC .............. *G06N 20/00* (2019.01); *G06F 17/16* (2013.01); *G06N 10/00* (2019.01)

(58) Field of Classification Search
CPC ........ G06N 20/00; G06N 10/00; G06F 17/16; G06F 16/9024; H04L 41/12; H04L 45/02
See application file for complete search history.

(56) References Cited

U.S. PATENT DOCUMENTS

| | | |
|---|---|---|
| 6,442,732 B1 | 8/2002 | Abramovici |
| 10,558,932 B1 | 2/2020 | Neven et al. |
| 2003/0005068 A1* | 1/2003 | Nickel .................. G06F 9/5066 709/208 |
| 2009/0083517 A1 | 3/2009 | Riddle |

(Continued)

OTHER PUBLICATIONS

Robust Classication with Adiabatic Quantum Optimization: Denchev, 2012, arxiv, 1205.1148v2.*

(Continued)

*Primary Examiner* — Michael J Huntley
*Assistant Examiner* — Peter D Coughlan
(74) *Attorney, Agent, or Firm* — Fish & Richardson P.C.

(57) ABSTRACT

A system comprises a network of computers comprising a master computer and slave computers. For a machine learning problem that is partitioned into a number of correlated sub-problems, each master computer is configured to store tasks associated with the machine learning problem, and each of the slave computers is assigned one of the correlated sub-problems. Each slave computer is configured to store variables or parameters or both associated with the assigned one of the correlated sub-problems; obtain information about one or more tasks stored by the master computer without causing conflict with other slave computers with regard to the information; perform computations to update the obtained information and the variables or parameters or both of the assigned sub-problem; send the updated information to the master computer to update the information stored at the master computer; and store the updated variables or parameters or both of the assigned sub-problem.

13 Claims, 7 Drawing Sheets

(56) References Cited

U.S. PATENT DOCUMENTS

| | | |
|---|---|---|
| 2009/0204470 A1 | 8/2009 | Weyl |
| 2009/0204471 A1 | 8/2009 | Elenbaas |
| 2010/0115027 A1 | 5/2010 | Ryu |
| 2013/0232094 A1* | 9/2013 | Anderson .......... G05B 23/0281 706/12 |
| 2014/0108308 A1 | 4/2014 | Stout |
| 2014/0205040 A1* | 7/2014 | Razaviyayn ......... H04B 7/0617 375/295 |
| 2015/0117216 A1* | 4/2015 | Anand .................... H04L 41/12 370/236 |

OTHER PUBLICATIONS

What is the Computational Value of Finite-Range Tunneling?; Denchev, 2016, Physical Review 6, 031015.*

When are nonconvex optimization problems not scary: Sun, 2016 (Year: 2016).*

"Training a Large Scale Classifier with the Quantum Adiabatic Algorithm": Neven, 2009.

"An introduction to distributed and parallel computing": Crichlow, 1988, Prentice Hall.

'NIPS 2009 Demonstration: Binary Classification using Hardware Implementation of Quantum Annealing': Neven, 2009.

Yun et al., "NOMAD: Non-locking, stochastic Multi-machine algorithm for Asynchronous and Decentralized matrix completion," arXiv:1312.0193v2 [cs.DC], Apr. 2014, pp. 1-18.

* cited by examiner

MULTI-MACHINE DISTRIBUTED LEARNING SYSTEMS

CLAIM OF PRIORITY

This application is a continuation application of, and claims priority to, U.S. patent application Ser. No. 14/694,762, filed on Apr. 23, 2015, which application claims priority under 35 USC § 119(e) to U.S. Patent Application Ser. No. 61/983,111, filed on Apr. 23, 2014. The disclosure of each of the foregoing applications is incorporated herein by reference.

BACKGROUND

This specification relates to multi-machine distributed learning systems.

SUMMARY

Multi-machine distributed learning systems can be used in solving machine learning problems, e.g., non-convex optimization and Bayesian learning. The systems include computer programs operated on computers, e.g., classical computers or ones that include quantum processors, connected in parallel. The computers can be configured to have a master-slave architecture in which one computer performs the role of a master while all other computers perform the role of slaves controlled by the master. The computer programs operate on the master and slave computers in the form of parallel computing. Generally, a machine learning problem can be partitioned into a group of sub-problems each handled by a slave computer. Each sub-problem is solved by iterations of computations carried out by its slave computer and with the help of the master computer. For example, the sub-problems can be correlated and the master computer can control the correlation among the sub-problems so that the each slave performs the iterative computations with the correctly updated parameters and variables.

Each of the slave computers can perform the computation iterations independently such that the sub-problems can be solved asynchronously. The slave computers work together to solve the machine learning problem without requiring mutex locks so that the systems are implemented in a lock-free manner. The systems can be error tolerant. For example, when one or more slave computers malfunction, information stored on the master computer can be retrieved to restore or replace those slave computers without disturbing the other slave computers that are functioning properly. The machine learning processes can continue without being significantly interrupted. In another example, when the master computer malfunctions, the information stored on the master computer can be retrieved to recover the machine learning processes at a moment earlier than the malfunction and continue with the processes.

Each of the sub-problems solved by a slave computer can involve stochastic gradient descent (SGD). Alternatively, each slave computer can be required solve a sub-problem that is computationally harder than SGD, e.g., non-convex optimization or Bayesian learning, to reduce the amount of network communication between the computers in the system. Generally, the network communication reduces the speed of the machine learning processes and reduction of the amount of network communication can improve the speed of the machine learning processes.

Each of the master computer and the slave computers can be a classical computer, or each can include a quantum processor. Sometimes some of the master computer and the slave computers are classical computers while the others include quantum processors. In some situations, in addition to the master and slave computers, additional quantum computers or processors can be used to receive input from the master computer and/or slave computers to solve parts of the machine learning problems. For example, solutions to the parts of the machine learning problems can be encoded in an energy spectrum, e.g., the ground state, of a many-body quantum Hamiltonian characterizing the quantum processor. The quantum processors can then be used to perform quantum annealing processes to find the energy spectrum and the solutions. Generally, the quantum processors can provide the solutions to these parts of the machine learning problems faster than, and/or with higher precision than, classical computers. Sometimes, e.g., when the parts of the problems are complex, e.g., NP-hard problems, the classical computers may not be able to provide solutions within reasonable time and the use of the quantum processors may be necessary.

The multi-machine distributed learning systems can be used to solve a variety of problems, including matrix completion, latent Dirichlet allocation, classification, and deep learning.

The details of one or more embodiments of the subject matter of this specification are set forth in the accompanying drawings and the description below. Other features, aspects, and advantages of the subject matter will be apparent from the description, the drawings, and the claims.

DETAILED DESCRIPTION

Example System Architecture

Figure 1:
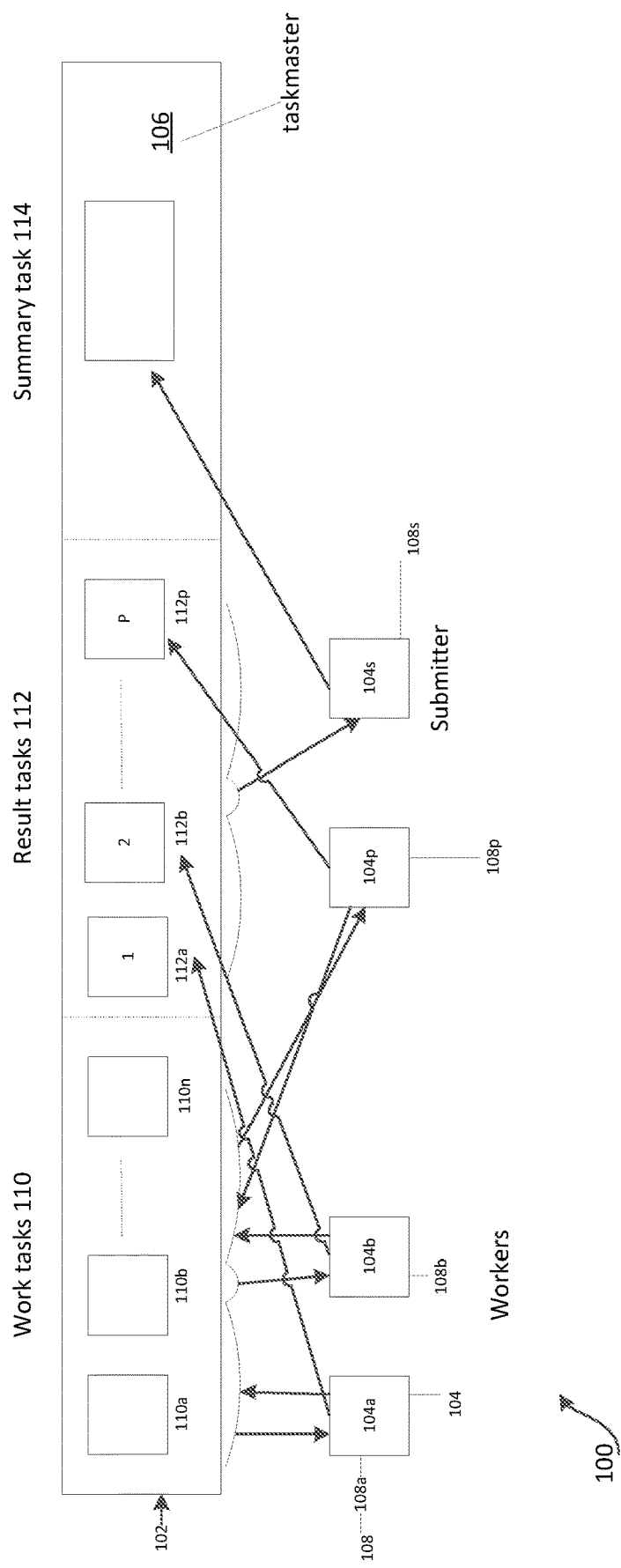
FIGS. 1, 2, 4, and 6 are block diagrams showing examples of multi-machine distributed learning systems.

FIG. 1 shows an example of a multi-machine distributed learning system 100 for solving a machine learning problem. The system 100 includes a taskmaster 106 operating on a master computer 102 and distributed workers 104 including workers 104a, 104b, . . . , 104p operating on respective distributed slave computers 108 including slave computers 108a, 108b, . . . , 108p, and a submitter 104s operating on a slave computer 108s. Each of the taskmaster 106, workers 104, and the submitter 104s can be in the form of computer programs. The master computer 102 and the slave computers 108 can be connected in a network and each can be a classical computer or can include a quantum processor that carries out instructions of the computer programs.

In some implementations, the taskmaster 106 responds to queries from the workers 104 and the submitter 104s and receives information, stores information received, and updates stored information based on information received, from the workers and the submitter, on the master computer 102. The information includes information about work tasks 110 to be carried out by the workers, result tasks 112 that contain results of the work tasks 110 carried out by the workers, and summary task 114s. The taskmaster 106 does not carry out actual computations for machine learning.

In some implementations, the workers 104 each work independently of each other on a sub-problem of the machine learning problem. The sub-problem can be defined by a task in the work tasks 110 stored on the master computer 102. The workers 104 communicate with the taskmaster 106, which coordinates the work on the different tasks by the different workers to collectively solve the machine learning problem. The submitter 104s does not work on any of the tasks for the machine learning problem. Instead, the submitter works on updating and maintaining the summary task 114. The workers 104 and the submitter 104s have different authorizations with regard to access and use of the information stored on the master computer 102.

The workers 104 and the submitter 104s can access authorized information stored on the master computer 102 using one or more of the following procedures:
Query: obtain information, e.g., of a task;
QueryandOwn: obtain and acquire ownership of information, e.g., a task, and prevent other workers/submitter from acquiring the information for a predetermined amount of time;
Update: update information, e.g., of a task.

An example of Query is a read action in which a worker 104 or the submitter 104s reads information stored by the taskmaster 106 on the master computer 102. Query to the same piece of information can be performed simultaneously by one or more workers and the submitter without causing any conflicts at the piece of information. The piece of the information being queried does not have to be locked for the query.

An example of QueryandOwn is a use action in which a worker 104 or the submitter 104s requests to use certain information and the use may result in updating the information. For example, the worker may be carrying out an iteration of computation using a current set of parameters and producing an updated set of parameters. The use of the information precludes other workers from using the same piece of information to allow the information to be properly updated. Typically, upon the worker's request, the taskmaster 106 sends a copy of the information to the worker and at the same time locks the information at the master computer 102 for the predetermined amount of time. The worker obtaining the information has to complete use of the information and update the information at the master computer 102, if necessary, within the predetermined amount of time, so that when the other workers are allowed to access the information, the information has been updated. In another example, the submitter 104s may need to update the information of a result task in the summary task 114 so the workers 104 are precluded from accessing the summary task 114 until the update is completed.

An example of Update is a write action in which a worker or the submitter 104s writes or requests the taskmaster 106 to write updated information to replace the corresponding stored information in the master computer 102.

Although the three access procedures, Query, QueryandOwn, and Update, are available to all workers 104 and the submitter 104s, the workers and the submitter 104s can only perform authorized procedure(s) on authorized information stored or to be stored on the master computer 102.

The work tasks 110 are n work tasks 110a, 110b, . . . , 110n. In some implementations, the number n of work tasks is determined based on the machine learning problem to be solved by the system 100 and the number of workers 104. The machine learning problem can be divided into the n work tasks to be carried out by the workers 104. Each work task contains a subset of variables of the machine learning problem or the statistics of a subset of random variables. In some implementations, the number n is the same as the number of workers 104. However, n does not have to be equal to the number of workers 104. Each worker can use any of the three access procedures to access any of the available work tasks that are not currently owned by another worker. The submitter 104s does not access the work tasks 110.

The result tasks 112 contains p result tasks 112a, 112b, . . . , 112p, each owned by a corresponding worker 104a, 104b, . . . , 104p. Each result task can only be updated by its owner or by the taskmaster 106 upon the request of its owner. Other workers and the submitter 104s who are not the owners of a result task cannot update the result task, but can only query, e.g., read, the result task at the master computer 102.

The summary task 114 contains summary of the tasks carried out by the workers 104. The summary task 114 is exclusively owned by the submitter 104s, who is allowed to update or request the taskmaster 106 to update the information of the summary task 114. For example, the submitter 104s may query the result tasks 112 to obtain information for updating the summary task 114. The workers 104 cannot update the summary task 114, but can only query, e.g., read, the summary task 114.

In solving a machine learning problem, the workers 104 and the submitter 104s can work together without using mutex locks. The configuration of the system 100 ensures that at any given time, the same piece of information stored or to be stored in the master computer 102 is not updated or written simultaneously by more than one of the workers 104 and the submitter 104s. Furthermore, because the information about the machine learning problem is stored and constantly updated by the taskmaster in the master computer, any failure of workers or the submitter does not have any major impact on the process of solving the problem. As a result, the system 100 can have high error tolerance.

Example Implementations

Many algorithms in machine learning can be implemented using the system 100. A few examples are described below.
1. Matrix Completion In a matrix completion problem, an incomplete data matrix X having N×D dimensions is decomposed into the product of two smaller matrices, A having N×K dimension and B having K×D dimension, where K is called the base number and is much smaller than both N and D:

$$X = \begin{pmatrix} x_{11} & x_{12} & \cdots & x_{1D} \\ x_{21} & x_{22} & \cdots & x_{2D} \\ \vdots & \vdots & \cdots & \vdots \\ x_{N1} & x_{N2} & \cdots & x_{ND} \end{pmatrix} = \begin{pmatrix} x_1 \\ x_2 \\ \vdots \\ x_N \end{pmatrix},$$

$$A = \begin{pmatrix} a_{11} & a_{12} & \cdots & a_{1K} \\ a_{21} & a_{22} & \cdots & a_{2K} \\ \vdots & \vdots & \cdots & \vdots \\ a_{N1} & a_{N2} & \cdots & a_{NK} \end{pmatrix} = \begin{pmatrix} a_1 \\ a_2 \\ \vdots \\ a_N \end{pmatrix},$$

$$B = \begin{pmatrix} b_{11} & b_{12} & \cdots & b_{1D} \\ b_{21} & b_{22} & \cdots & b_{2D} \\ \vdots & \vdots & \cdots & \vdots \\ b_{K1} & b_{N2} & \cdots & b_{ND} \end{pmatrix} = (b_1 \ b_2 \ \ldots \ b_D), \text{ where}$$

$$x_l = (x_{l1} \ x_{l2} \ \ldots \ x_{lD}), a_j = (a_{j1} \ a_{j2} \ \ldots \ a_{jK}), b_i = \begin{pmatrix} b_{1i} \\ b_{2i} \\ \vdots \\ b_{Ki} \end{pmatrix},$$

and $l = 1, \ldots, N; j = 1, \ldots, N;$ and $i = 1, \ldots, D.$

The incomplete data matrix X has at least some data elements $x_{ij}$ unknown. Matrices A and B are to be determined so that the residual of $\|X-A\;B\|$ is smaller than a predetermined value.

Solutions to a matrix completion problem, i.e., finding the matrices A and B with all matrix elements $a_{ij}$ and $b_{ij}$ known, can have many uses, including in movie/music recommendation, player matching, advertisement matching, and so on. For example, in movie recommendation, each row of the matrix X can represent a user and each column of the matrix X can represent a movie. Each matrix element $x_{ij}$ can represent the ith user's rating of the jth movie. At least some of the N users may have rated less than all of the D movies. However, the ratings of those unrated movies by these users can be predicted using a machine learning process based on the known ratings of these users and the other users.

The matrix X can be completed using the system 100 of FIG. 1 by computing a minimum of an objective function:

$$\min_{A,B} F(A, B) = \sum_{i,j \in I} (x_{ij} - A_i B_j)^2 + \sum_i \lambda \|A_i\|^2 + \sum_i \lambda \|B_j\|^2$$

where $\lambda>0$ is a scalar, $A_i$, $B_j$ are sub-matrices $a_i$, $b_j$.

Figure 2:
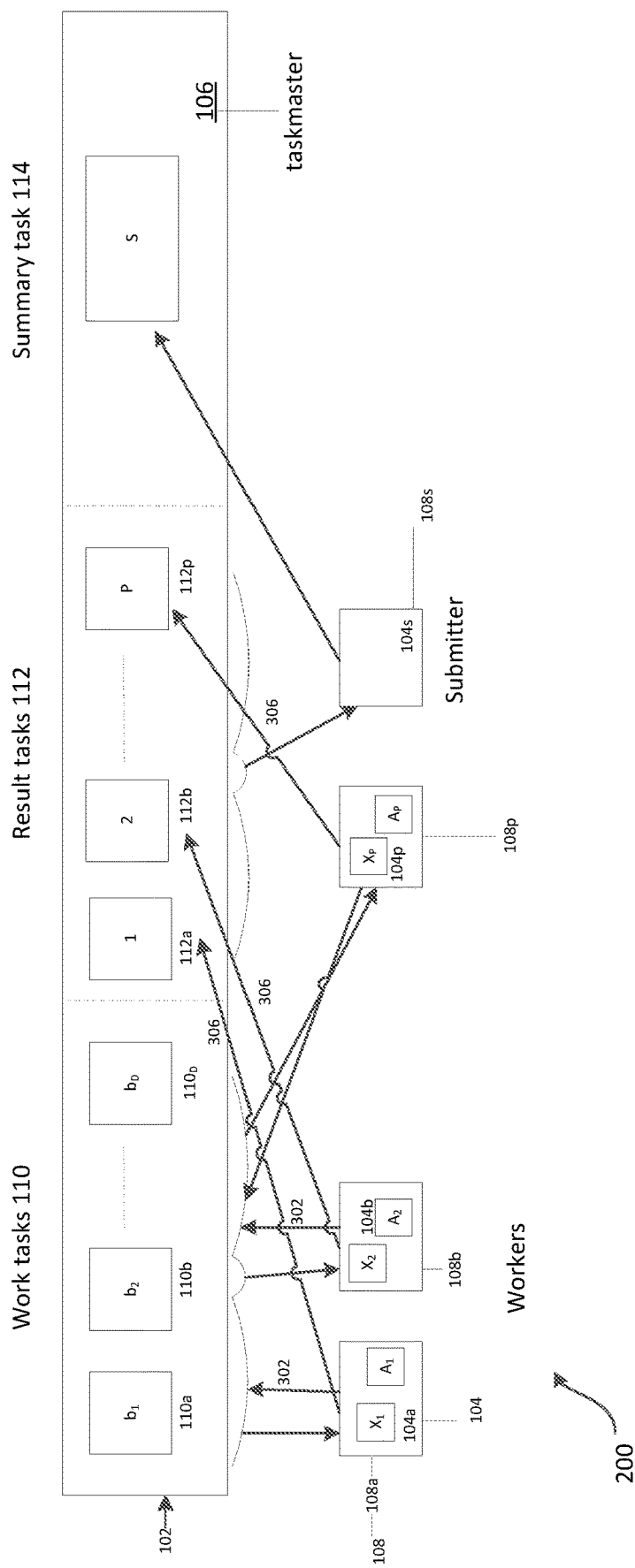

FIG. 2 shows how a system 200 that has the same hardware and software architectures as the system 100 of FIG. 1 is used in solving the matrix completion problem described above. Typically, the matrix X is very large. In the example of movie rating, the matrix X can have millions of rows. The matrix X is partitioned row-wise into p sub-matrices $X_m$, m=1, ..., p. Each sub-matrix $X_m$ can contain one or more row sub-matrices $x_i$. Different sub-matrices $X_m$ can have different numbers of rows. The division of the matrix X can be done by a computer different from all computers in the system 200 or by the master computer 102. Sometimes a user can make the division. The division can be made based on various factors, e.g., load balancing of the different slave computers, or the number of unknown matrix elements in each sub-matrix. Each sub-matrix $X_m$ is stored by a worker 104m on its corresponding slave computer 108m.

Corresponding to the division of the matrix X, the matrix A is divided row-wise into sub-matrices $A_m$, where m=1, ..., p. Each sub-matrix $A_m$ has the same number of rows as its corresponding sub-matrix $X_m$ and can be initialized to have random values for its matrix elements. The initialized values for each sub-matrix $A_m$ are stored by a worker 104m on its slave computer 108m with the corresponding sub-matrix $X_m$. In computing a minimum of the objective function, the values of the matrix elements for the sub-matrix $A_m$ are updated in iterations based on the computations performed by the workers 104; and the worker 104m stores the updated values on the slave computer 108m. The matrix B is stored in work tasks column-wise such that each row sub-matrix $b_i$ is stored as one work task 110i. Like the sub-matrix $A_m$ each sub-matrix $b_i$ can be initialized to have random values for its matrix elements. In computing a minimum of the objective function, the values of the matrix elements for the sub-matrix $b_i$ are updated in iterations based on the computations performed by the workers 104; and the taskmaster 106 stores the updated values on the master computer 102.

By dividing the matrices A, B, and X, computing a minimum of the objective function F(A, B) is decomposed into sub-problems $F_m(A, B)$ each only depending on sub-matrices $A_m$ and $b_i$, where i=1, ..., D. Each sub-problem completes a sub-matrix $X_m$. Each worker 104m uses its slave computer 108m to work on a sub-problem $F_m(A, B)$ and determine an optimized sub-matrix $X_m$. Different workers 104 work on different sub-problems. However, the optimization of a sub-matrix $X_m$ by the worker 104m depends on the optimization of the sub-matrices $b_i$, and therefore, the other sub-problems being solved by the other workers.

To optimize a sub-matrix $X_m$, a worker 104m has to use the entire matrix B based on:

$$X_m = \sum_{i=1}^{D} A_m b_i.$$

However, in carrying out the matrix completion task, instead of using the entire matrix B, each worker can perform a QueryandOwn to use a mini-batch of the tasks $\{b_i\}$, where i is a sub-group of 1, ..., D. The size of the mini-batch can be predetermined or can be dynamically determined, e.g., based on load balancing and/or progress of the different completion processes at different slave computers. As a result, different workers can work on a part of their corresponding sub-matrix $X_m$ simultaneously. Over multiple iterations and multiple QueryandOwn procedures, a worker can own the entire matrix B and work on the entire sub-matrix $X_m$.

Figure 3:
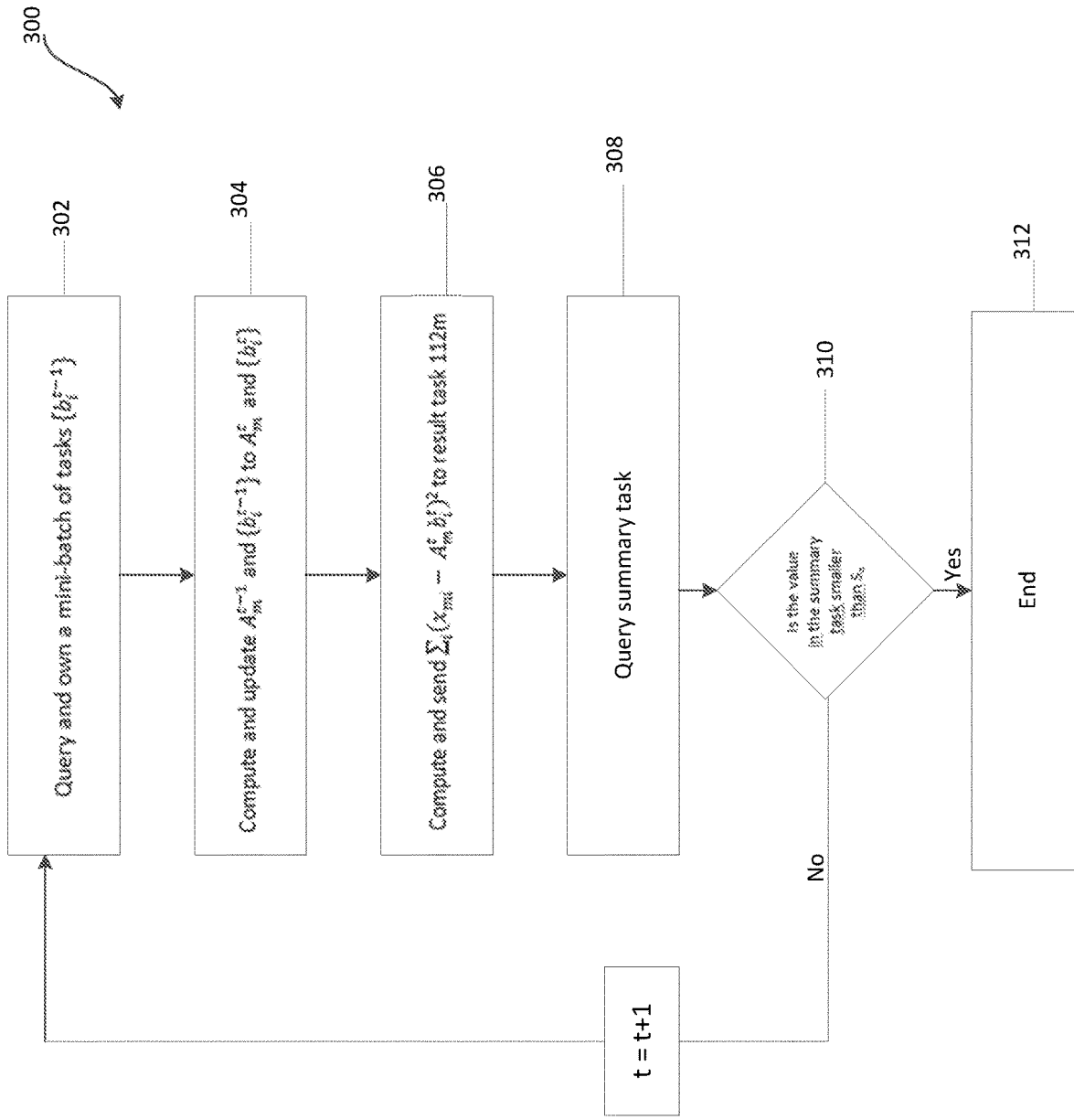
FIGS. 3, 5, and 7 are flow diagrams showing examples of processes performed by a worker on a slave computer.

FIG. 3 shows an example process 300 of solving a sub-problem $F_m(A, B)$ by a worker 104m. The worker 104m performs a QueryandOwn 302 to use a mini-batch of tasks $\{b_i^{t-1}\}$, where i is a sub-group of 1, ..., D and t is the current number of iterations of computation the worker 104m is to perform. Upon receiving the requested mini-batch from the taskmaster 102, the worker 104m computes 304 $A_m^t$ and $\{b_i^t\}$ and performs an Update 304 on the tasks at the master computer 102. The worker 104m also computes 306 residual:

$$\sum_i (X_{mi} - A_m^t b_i^t)^2$$

and sends 306 the computed residual to the taskmaster to be stored at its corresponding result task 112m. Effectively, the worker 104m performs an Update to store the residual at the result task 112m. The worker 104m then performs a Query 308 to read the summary task 114 and determines 310 whether the value in the summary task 114 is smaller than a predetermined value $S_0$. The summary task contains a summary of all residuals from the result tasks 112. The submitter 104s regularly performs a Query to read each of the result tasks 112 and performs an Update on the summary task 114. If the value in the summary task 114 is smaller than a predetermined value $S_0$, the optimization of the sub-matrix $X_m$ ends 312. The matrix X can be completed based on the optimized matrices A and B. If the value in the summary task 114 is greater than a predetermined value $S_0$, then the worker 104m enters the next iteration and increments t by 1.

The computation of $A_m^t$ and $\{b_i^t\}$ in each iteration can be based on stochastic gradient decent (SGD):

$$A_i^t = A_i^{t-1} + \gamma^t (x_{ij} - A_i^{t-1} B_j^{t-1}) B_j^{t-1},$$

$$B_j^t = B_j^{t-1} + \gamma^t (x_{ij} - A_i^{t-1} B_j^{t-1}) A_i^{t-1}.$$

where $B_j^t = \{b_i^t\}$, and $\gamma^t$ is a sequence of step sizes.

Alternatively, each worker can solve a harder optimization problem than SGD based on the following equation:

$$(A_i^t, B_j^t) = \operatorname*{argmin}_{A_i, B_j}\{(x_{ij} - A_i B_j)^2 + \lambda^t \| A_i - A_i^{t-1} \|^2 + \lambda^t \| B_j - B_j^{t-1} \|^2\}$$

where $\lambda^t$ is a sequence of step sizes. This alternative optimization problem is non-convex because it contains 4th order polynomials. To solve the problem, coordinate descent or global optimization methods including quantum annealing can be used. For example, $A_i^{t-1}$, $B_j^{t-1}$, and $\lambda^t$ can be input into a quantum processor, which outputs $A_i^t$ and $B_j^t$.

2. Latent Dirichlet Allocation

Latent Dirichlet Allocation (LDA) is a Bayesian learning method, and an example of the use of LDA is in text clustering. Text clustering can include extracting topics of different documents, automatically organizing documents, e.g., based on topics, and fast retrieving or filtering information contained in the documents. To perform text clustering on a group of documents, each document is represented by words of a pre-determined vocabulary of words while the order of the words in the document is ignored. For example, a document containing the sentence: "The apple company has an apple logo." is represented by "the: 1, apple: 2, company: 1, has: 1, an: 1, logo: 1". Each number after a word represents the total number of times the word appears in the document. Sometimes the same word appearing multiple times can have different meanings. For example, the word "apple" in the example document above appears two times and has two different meanings. For a total of N documents and V words for representing all the documents, the documents can be represented by the following matrix:

$$X = \begin{pmatrix} x_{11} & x_{12} & \cdots & x_{1V} \\ x_{21} & x_{22} & \cdots & x_{2V} \\ \vdots & \vdots & \cdots & \vdots \\ x_{N1} & x_{N2} & \cdots & x_{NV} \end{pmatrix} = \begin{pmatrix} x_1 \\ x_2 \\ \vdots \\ x_N \end{pmatrix},$$

where $x = (x_{l1}\ x_{l2} \ldots x_{lV})$, and $l = 1, \ldots, N$. Each matrix element $x_{ij}$ represents the number of times a word $j$ appears in a document $i$.

In LDA, it is assumed that each word $j$ in the document $i$ has a topic $z_{ij} \in \{1, \ldots, K\}$. A topic matrix Z for all N documents can be written as:

$$Z = \begin{pmatrix} z_{11} & z_{12} & \cdots & z_{1K} \\ z_{21} & z_{22} & \cdots & z_{2K} \\ \vdots & \vdots & \cdots & \vdots \\ z_{N1} & z_{N2} & \cdots & z_{NK} \end{pmatrix} = \begin{pmatrix} z_1 \\ z_2 \\ \vdots \\ z_N \end{pmatrix},$$

Here, the topic is analogous to a base in matrix completion described above. The same word appearing multiple times having multiple meanings has multiple topics. Using Gibbs sampling, which is a Markov chain Monte Carlo (MCMC) method, the probability of word $j$ in the document $i$ having the topic $k$ is sampled based on the current assignment of the topic of all other words:

$$P(z_{ij} = k)$$

-continued $$\propto (n_{ik} + \alpha) \cdot \frac{n_{kj} + \beta}{n_k + V\beta},$$

where $n_{ik}$ is the number of words in document i that has the topic k; $n_{kj}$ is the number of words j that has topic k; and $n_k$ is the total number of words that has the topic k. Parameters $\alpha$ and $\beta$ are constants. For $k = 1, \ldots, K$ total topics, the following vectors can be used:

$n_{kj} = (n_{1j}\ n_{2j}, \ldots n_{Kj})$, for each word j;
$n_{ik} = (n_{i1}\ n_{i2} \ldots n_{iK})$, for each document I;
$n_k = (n_1\ n_2 \ldots n_K)$, for all words and all documents.

Figure 4:
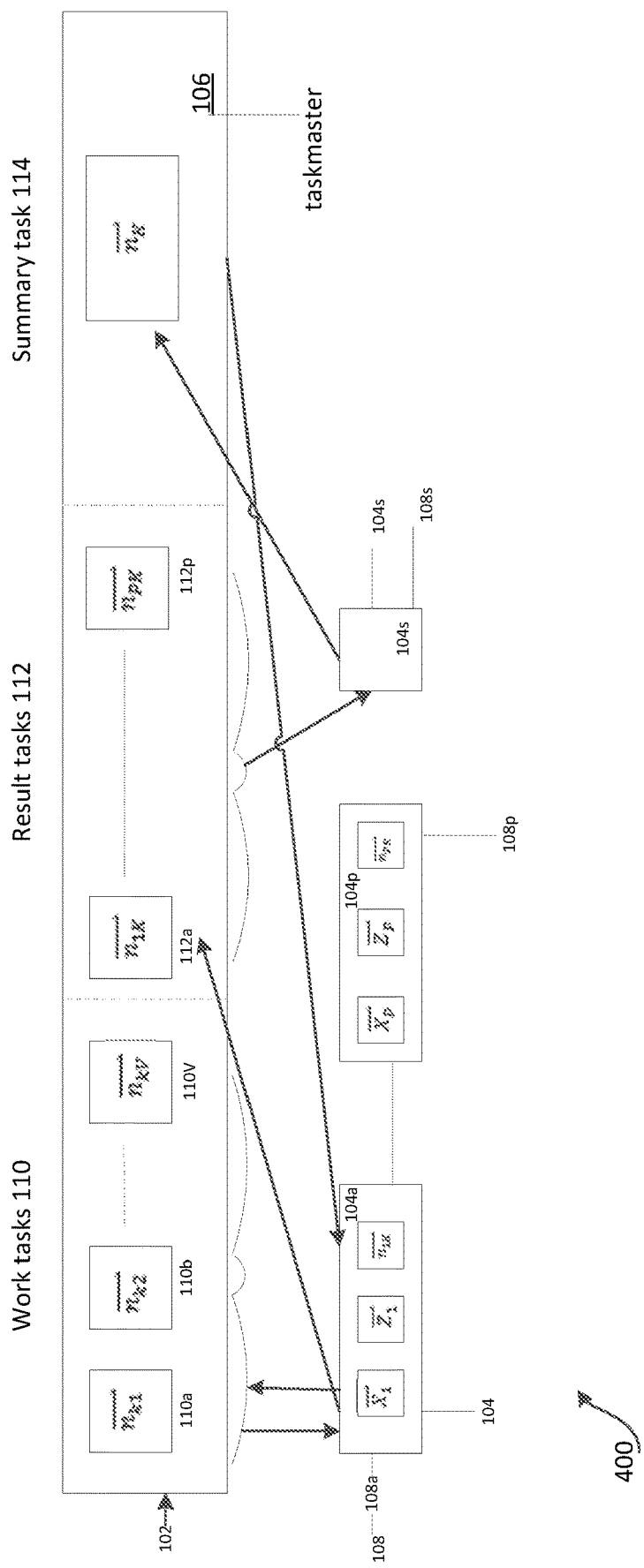

FIG. 4 shows how a system 400 that has the same hardware and software architectures as the system 100 of FIG. 1 is used in solving the text clustering problem described above. The total number of documents for use in the test clustering is divided into p sub-groups, each to be assigned to a worker 104 to work on a slave computer. Corresponding to the division of the matrix X, the topic matrix is also divided into p sub-matrices $Z_1, \ldots, Z_p$.

Each worker 104m stores on its slave computer 108m a sub-matrix $X_m$ which corresponds to the assigned document group $\{x_l\}$ and corresponding topic sub-matrix $Z_m$, which corresponds to topic group $\{z_l\}$. The worker 104m also stores and updates all $n_{ik}$ for the assigned document group $\{x_l\}$. Furthermore, each word j and its topic assignment statistics $n_{kj}$ are stored as a work task 110j by the taskmaster 106. To solve the text clustering problem, the system 400 determines $n_{kj}$ and $n_{ik}$ using iterative computations performed by each worker 104. Similar to the matrix completion problem, in each iteration, each worker obtains a mini-batch of tasks from the master computer 102.

Figure 5:
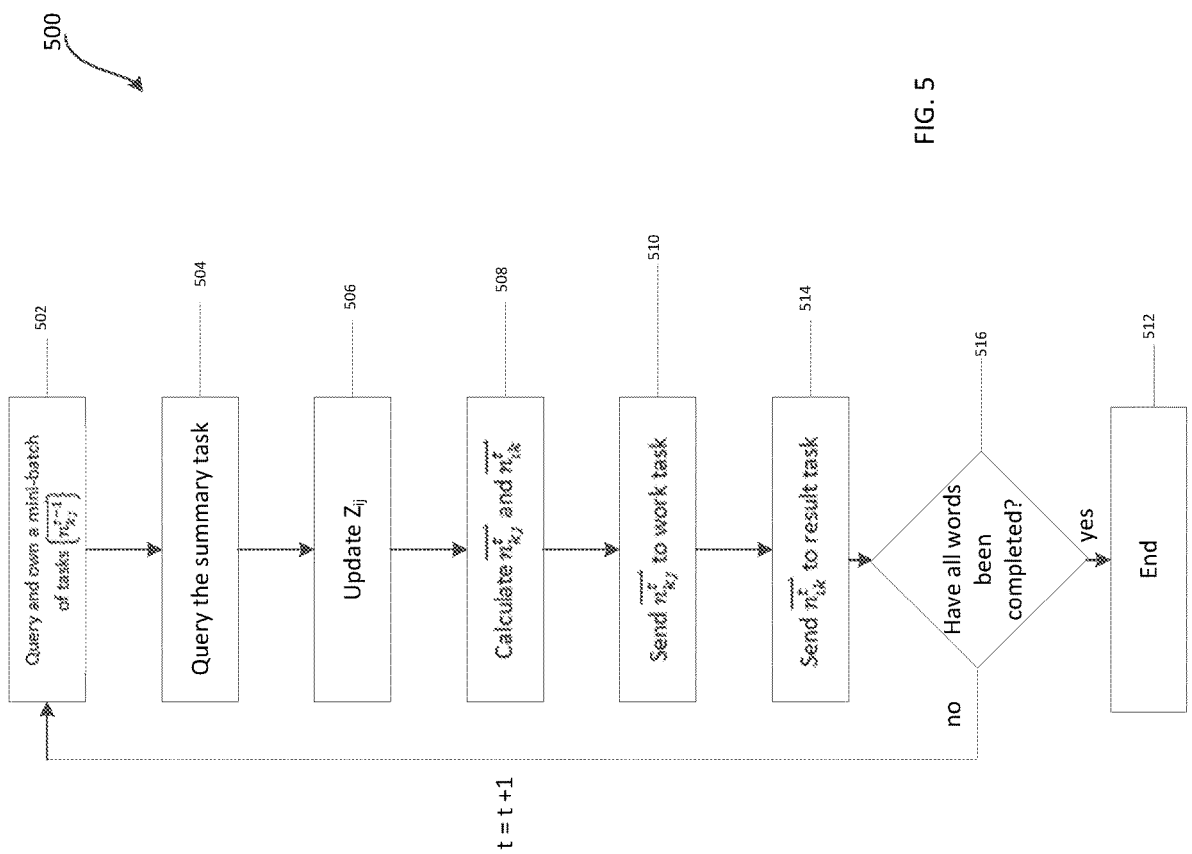

FIG. 5 shows an example process 500 of text clustering a sub-group of documents represented by the matrix $X_m$ by a worker 104m. The worker 104m performs a QueryandOwn 502 to use a mini-batch of tasks $\{n_{kj}^{t-1}\}$, where j is a sub-group of $1, \ldots, V$ and t is the current number of iterations of computation the worker 104 $m$ is to perform. The worker 104m also performs a Query 504 to read the summary task 114 to obtain $n_k$. Upon receiving the requested mini-batch from the taskmaster 102, the worker 104m updates 506 $z_{ij}$ based on the calculation of $P(z_{ij} = k)$. The worker 104m then calculates 508 $n_{kj}^t$ and $n_{ik}^t$, and sends 510 $n_{kj}^t$ to the taskmaster 106 to update the work task 110j. Furthermore, the worker 104m sends 514 $n_{ik}^t$ to its corresponding result task 112m. The submitter 104s regularly performs a Query to read each of the result tasks 112 and performs an Update on the summary task 114. If the worker 104m determines 516 has completed for all V words, then the iteration ends 512. Otherwise the worker 104m enters the next iteration $t + 1$.

3 Classification

The distributed learning system 100 can also be applied in classification. For simplicity of the description, binary classification is described. Other classification problems, e.g., multi-class classification problems, can be similarly solved.

As an example, a binary classification problem has a loss function L, data $$X = \begin{pmatrix} x_{11} & x_{12} & \cdots & x_{1D} \\ x_{21} & x_{22} & \cdots & x_{2D} \\ \vdots & \vdots & \cdots & \vdots \\ x_{N1} & x_{N2} & \cdots & x_{ND} \end{pmatrix} = \begin{pmatrix} x_1 \\ x_2 \\ \vdots \\ x_N \end{pmatrix},$$

labels $y=\{y_1, \ldots, y_n\} \in \{+1, -1\}^n$ and parameter $w=(w_1 \ w_2 \ \ldots \ w_D)^T$.

The objective function to minimize is:

$$R(w) = \sum_{i=1}^{n} L(\langle y_i x_i, w \rangle)$$

$$= \sum_{i=1}^{n} L\left(\sum_{j=1}^{d} y_i x_{ij} w_j\right)$$

Figure 6:
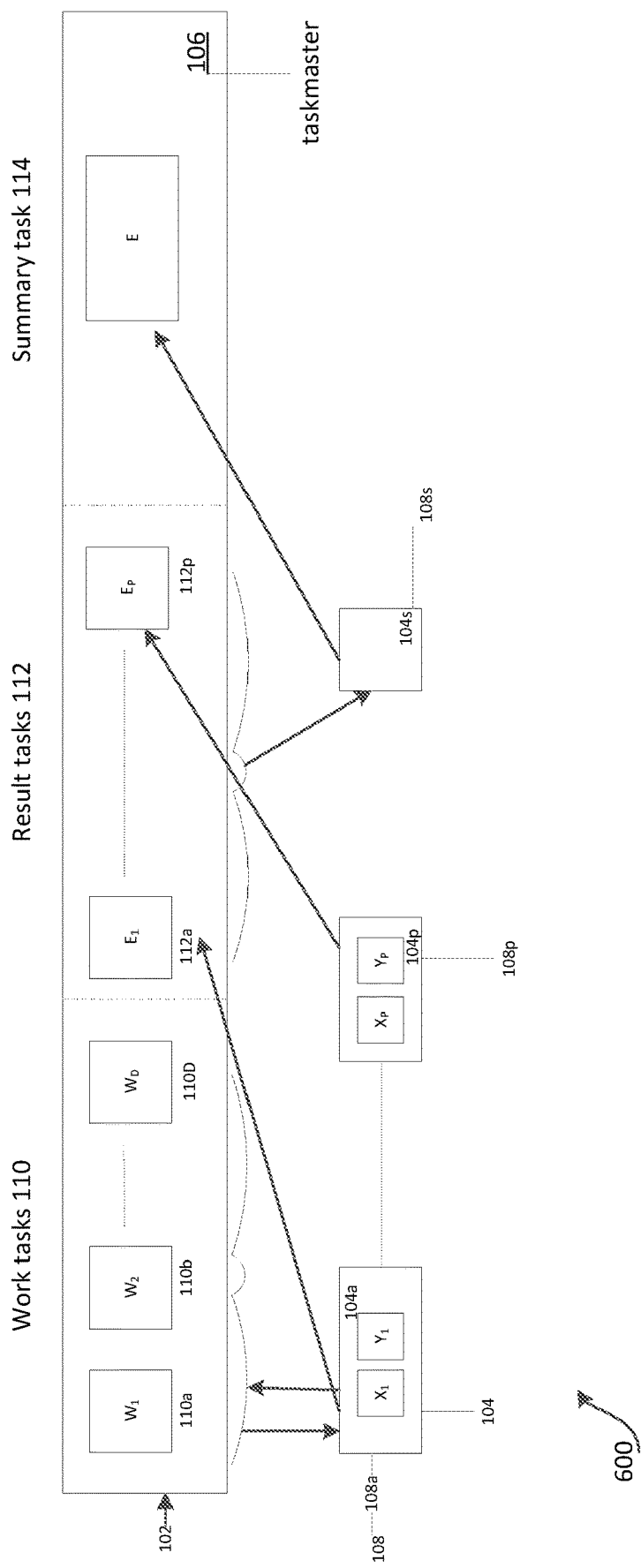

FIG. 6 shows how a system 600 that has the same hardware and software architectures as the system 100 of FIG. 1 is used in solving the binary classification problem described above. The parameter element $w_i$ of the vector w is stored as a work task 110$i$ in the master computer 102. The data matrix X is partitioned into sub-matrices $X_m$, each corresponding to a group of row sub-matrices $\{x_i\}$ and stored by a corresponding worker 104$m$ on its slave computer 108$m$. A label $y_m$ corresponding to the sub-matrices $X_m$ is also stored on the same slave computer 108.

Figure 7:
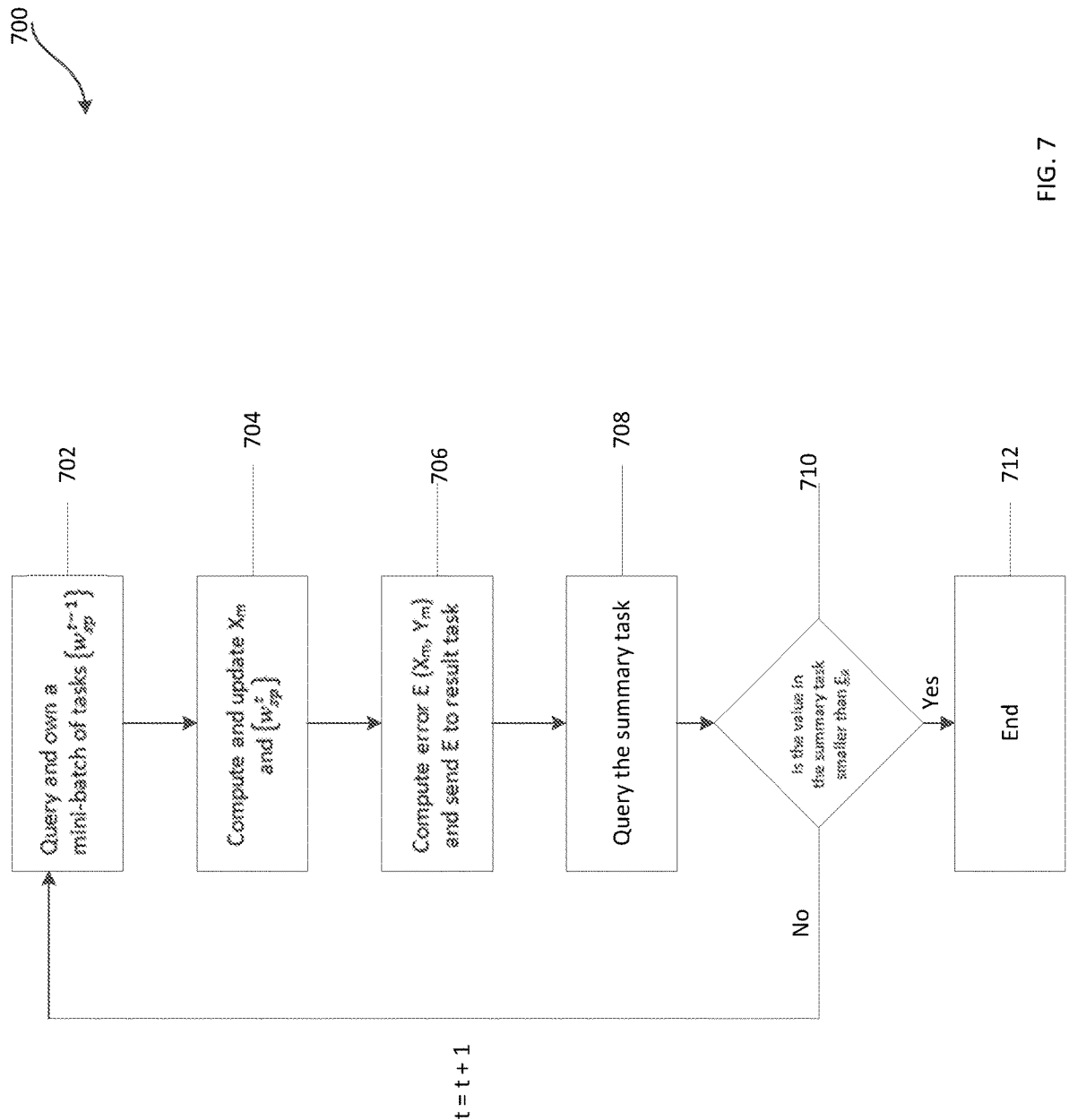

FIG. 7 shows an example process 700 of solving a sub-problem of the binary classification by a worker 104$m$. The worker 104$m$ performs a QueryandOwn 702 to use a mini-batch of tasks $\{w_{sp}^{t-1}\}$, where sp is a sub-group of 1, . . . , D and t is the current number of iterations of computation the worker 104$m$ is to perform. Upon receiving the requested mini-batch from the taskmaster 102, the worker 104$m$ computes 304 $X_m$ and $\{w_{sp}^{t}\}$ and performs an Update 704 on the tasks at the master computer 102. The worker 104$m$ also computes 706 the error:

$E(X_m, y_m)$, and sends 706 the computed error to the taskmaster 106 to be stored at its corresponding result task 112$m$. Effectively, the worker 104$m$ performs an Update on the stored residual at the result task 112$m$. The worker 104$m$ then performs a Query 708 to read the summary task 114 and determines 710 whether the value in the summary task 114 is smaller than a predetermined value $E_0$. The summary task contains a summary of all errors from the result tasks 112. The submitter 104$s$ regularly performs a Query to read each of the result tasks 112 and performs an Update on the summary task 114. If the value in the summary task 114 is smaller than a predetermined value $E_0$, the optimization of the sub-matrix $X_m$ ends 712. If the value in the summary task 114 is greater than a predetermined value $E_0$, then the worker 104$m$ enters the next iteration t+1.

In each iteration, the update of the sub-matrix $X_m$ and the parameters $\{w_{sp}^t\}$ can be performed using SGD similarly to the update of the described process for matrix completion.

Alternatively, instead of computing the gradient with respect to $w_{sp}$, the following problem can be solved:

$$w_{S_p}^t = \underset{w_{S_p}}{\operatorname{argmin}} \left\{ \sum_{i \in I_p} L\left(\sum_{j \in S_p} y_i x_{ij} w_j + \sum_{j \notin S_p} y_i x_{ij} w_j^{t-1}\right) + \lambda^t \|w_{S_p} - w_{S_p}^{t-1}\|^2 \right\}.$$

In some implementations, the loss function L is a non-convex loss function, and the above problem is a non-convex sub-problem. Compared to the original size (N×D) of the problem, this sub-problem is much smaller ($|I_p| \times |S_p|$). In some implementations, global optimization methods including quantum annealing can be used to solve the sub-problem. For example, $w_{sp}^{t-1}$, $x_{ij}$, $y_i$, and $\lambda^t$ can be input into a quantum processor, which outputs $w_{sp}^t$.

4. Deep Learning

The learning system 100 can also be used in deep learning. Datasets can be partitioned for the p different slave computers. In each iteration, each computer can execute a QueryandOwn to use some parameters based on the data it has and the past parameter it had, similarly to the classification problem described above.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable digital processor, a digital computer, or multiple digital processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). For a system of one or more computers to be "configured to" perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Control of the various systems described in this specification, or portions of them, can be implemented in a computer program product that includes instructions that are stored on one or more non-transitory machine-readable storage media, and that are executable on one or more processing devices. The systems described in this specification, or portions of them, can be implemented as an apparatus, method, or electronic system that may include one or more processing devices and memory to store executable instructions to perform the operations described in this specification.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprising:
   a network of computers comprising
      a master computer, and
      two or more slave computers,
   wherein for a machine learning problem that is partitioned into a number of correlated NP hard non-convex optimization sub-problems, the machine learning problem comprising determining a solution to an objective function problem $$\min_{A,B} F(A, B) = \sum_{i,j \in I} (x_{ij} - A_i B_j)^2 + \sum_i \lambda \|A_i\|^2 + \sum_j \lambda \|B_j\|^2$$

for completing an incomplete data matrix X having N×D dimensions, where X is approximated by a product of matrices A and B, and where $A_i$ represents a sub-matrix of the matrix A that has the same number of columns as the matrix A, and $B_j$ represents a sub-matrix of the matrix B that has the same number or rows as the matrix B, the master computer being configured to store tasks associated with the machine learning problem, and each of the slave computers being assigned one of the NP hard non-convex optimization sub-problems and being configured to:
   store variables or parameters or both associated with the assigned NP hard non-convex optimization sub-problem;
   query information about one or more tasks stored by the master computer without causing conflict with other slave computers with regard to the information; and
   solve the assigned NP hard non-convex optimization sub-problem, comprising performing computations to update i) the queried information about the one or more tasks, and ii) the variables or parameters or both of the assigned NP hard non-convex optimization sub-problem, wherein performing the computations comprises updating Ai and Bj in iterations by a slave computer based on the following equation:

$$(A_i^t, B_j^t) = \operatorname*{argmin}_{A_i, B_j} \{(x_{ij} - A_i B_j)^2 + \lambda^t \|A_i - A_i^{t-1}\|^2 + \lambda^t \|B_j - B_j^{t-1}\|^2\}$$

where $\lambda^t$ is a sequence of step sizes, and t is current number of iterations.

2. The system of claim 1, wherein performing computations to update i) the queried information about the one or more tasks, and ii) the variables or parameters or both of the assigned NP hard non-convex optimization sub-problem comprises performing computations that are computationally harder than stochastic gradient descent.

3. The system of claim 1, wherein the two or more slave computers are configured to asynchronously:
  store variables or parameters or both associated with the assigned NP hard non-convex optimization sub-problem;
  query information about one or more tasks stored by the master computer without causing conflict with other slave computers with regard to the information; and
  perform computations to update i) the queried information about the one or more tasks, and ii) the variables or parameters or both of the assigned NP hard non-convex optimization sub-problem.

4. The system of claim 1, wherein the slave computer includes a quantum processor, and $A_i^{t-1}$, $B_j^{t-1}$, and $\lambda^t$ are input into the quantum processor and $A_i^t$ and $B_j^t$ are output from the quantum processor.

5. The system of claim 1, wherein:
  workers operate on respective slave computers,
  a submitter operates on one of the slave computers, wherein the submitter is configured to update and maintain a summary task containing a summary of tasks carried out by the workers, and
  the workers and the submitter work together without using mutex locks, and wherein at any given time, information stored or to be stored in the master computer is not updated or written simultaneously by more than one of the workers and the submitter.

6. A system comprising:
  a network of computers comprising
    a master computer, and
    two or more slave computers,
  wherein for a machine learning problem that is partitioned into a number of correlated NP hard non-convex optimization sub-problems, the machine learning problem comprising determining a minimum of an objective function $$R(w) = \sum_{i=1}^{n} L(\langle y_i x_i, w \rangle)$$
$$= \sum_{i=1}^{n} L\left(\sum_{j=1}^{d} y_i x_{ij} w_j\right)$$

for binary classification problem that has a data set $$X = \begin{pmatrix} x_{11} & x_{12} & \ldots & x_{1D} \\ x_{21} & x_{22} & \ldots & x_{2D} \\ \vdots & \vdots & \ldots & \vdots \\ x_{N1} & x_{N2} & \ldots & x_{ND} \end{pmatrix} = \begin{pmatrix} x_1 \\ x_2 \\ \vdots \\ x_N \end{pmatrix},$$

with labels $y=\{y_1, \ldots, y_n\} \in \{+1, -1\}^n$ and parameter $w=(w_1 w_2 \ldots w_D)^T$, the master computer being configured to store tasks associated with the machine learning problem, and each of the slave computers being assigned one of the NP hard non-convex optimization sub-problems and being configured to:
  store variables or parameters or both associated with the assigned NP hard non-convex optimization sub-problem;
  query information about one or more tasks stored by the master computer without causing conflict with other slave computers with regard to the information; and
  solve the assigned NP hard non-convex optimization sub-problem, comprising performing computations to update i) the queried information about the one or more tasks, and ii) the variables or parameters or both of the assigned NP hard non-convex optimization sub-problem, wherein performing computations to update i) the queried information about the one or more tasks, and ii) the variables or parameters or both of the assigned NP hard non-convex optimization sub-problem comprises updating a sub-group of parameters $w_{S_p}$ in iterations by a slave computer according to the following equation:

$$w_{S_p}^t = \underset{w_{S_p}}{\mathrm{argmin}}\left\{\sum_{i \in I_p} L\left(\sum_{j \in S_p} y_i x_{ij} w_j + \sum_{j \notin S_p} y_i x_{ij} w_j^{t-1}\right) + \lambda^t \left\|w_{S_p} - w_{S_p}^{t-1}\right\|^2\right\}.$$

where $S_p$ is a sub-group of $1, \ldots, D$, t is a current iteration, and L is a loss function of the binary classification.

7. The system of claim 6, wherein the slave computer includes a quantum processor.

8. A computer implemented method comprising:
  for a machine learning problem that is partitioned into a number of correlated NP hard non-convex optimization sub-problems, wherein the machine learning problem comprises determining a solution to an objective function problem $$\min_{A,B} F(A, B) = \sum_{i,j \in I} (x_{ij} - A_i B_j)^2 + \sum_i \lambda \|A_i\|^2 + \sum_i \lambda \|B_j\|^2$$

for completing an incomplete data matrix X having N×D dimensions, where X is approximated by a product of matrices A and B, and where $A_i$ represents a sub-matrix of the matrix A that has the same number of columns as the matrix A, and $B_j$ represents a sub-matrix of the matrix B that has the same number or rows as the matrix B:
  storing, by a master computer, tasks associated with the machine learning problem; and
  for each of multiple slave computers being assigned a respective NP hard non-convex optimization sub-problem of the correlated NP hard non-convex optimization sub-problems;
  storing variables or parameters or both associated with the assigned NP hard non-convex optimization sub-problem;
  querying information about one or more tasks stored by the master computer without causing conflict with other slave computers with regard to the information; and
  solving the assigned NP hard non-convex optimization sub-problem, comprising performing computations to update i) the queried information about the one or more tasks, and ii) the variables or parameters or both of the assigned NP hard non-convex optimization sub-problem, wherein performing the computations comprises updating $A_i$ and $B_j$ in iterations by a slave computer based on the following equation:

$$(A_i^t, B_j^t) = \underset{A_i, B_j}{\mathrm{argmin}}\left\{(x_{ij} - A_i B_j)^2 + \lambda^t \left\|A_i - A_i^{t-1}\right\|^2 + \lambda^t \left\|B_j - B_j^{t-1}\right\|^2\right\}$$

where $\lambda^t$ is a sequence of step sizes, and t is a current number of iterations.

9. The method of claim 8, wherein performing computations to update i) the queried information about the one or more tasks, and ii) the variables or parameters or both of the assigned NP hard non-convex optimization sub-problem comprises performing computations that are computationally harder than stochastic gradient descent.

10. The method of claim 8, wherein storing variables or parameters or both associated with the assigned non-convex optimization NP hard sub-problem, querying information about one or more tasks stored by the master computer without causing conflict with other slave computers with regard to the information, and performing computations to update i) the queried information about the one or more tasks, and ii) the variables or parameters or both of the assigned NP hard non-convex optimization sub-problem, are performed asynchronously.

11. The method of claim 8, wherein the slave computer includes a quantum processor, and $A_i^{t-1}$, $B_i^{t-1}$, and $\lambda^t$ are input into the quantum processor and $A_i^t$ and $B_i^t$ are output from the quantum processor.

12. A computer implemented method comprising:

for a machine learning problem that is partitioned into a number of correlated NP hard non-convex optimization sub-problems, wherein the machine learning problem comprises determining a minimum of an objective function $$R(w) = \sum_{i=1}^{n} L(\langle y_i x_i, w \rangle)$$
$$= \sum_{i=1}^{n} L\left(\sum_{j=1}^{d} y_i x_{ij} w_j\right)$$

for binary classification problem that has a data set $$X = \begin{pmatrix} x_{11} & x_{12} & \dots & x_{1D} \\ x_{21} & x_{22} & \dots & x_{2D} \\ \vdots & \vdots & \dots & \vdots \\ x_{N1} & x_{N2} & \dots & x_{ND} \end{pmatrix} = \begin{pmatrix} x_1 \\ x_2 \\ \vdots \\ x_N \end{pmatrix},$$

labels $y = \{y_1, \ldots, y_n\} \in \{+1, -1\}^n$ and parameter $w = (w_1 \ w_2 \ldots w_D)^T$;

storing, by a master computer, tasks associated with the machine learning problem; and for each of multiple slave computers being assigned a respective NP hard non-convex optimization sub-problem of the correlated NP hard non-convex optimization sub-problems;

storing variables or parameters or both associated with the assigned NP hard non-convex optimization sub-problem;

querying information about one or more tasks stored by the master computer without causing conflict with other slave computers with regard to the information; and solving the assigned NP hard non-convex optimization sub-problem, comprising performing computations to update i) the queried information about the one or more tasks, and ii) the variables or parameters or both of the assigned NP hard non-convex optimization sub-problem, wherein performing computations to update i) the queried information about the one or more tasks, and ii) the variables or parameters or both of the assigned correlated NP hard sub-problem comprises updating a sub-group of parameters $w_{s_p}$ in iterations by a slave computer according to the following equation:

$$w_{S_p}^t = \operatorname*{argmin}_{w_{S_p}} \left\{ \sum_{i \in I_p} L\left( \sum_{j \in S_p} y_i x_{ij} w_j + \sum_{j \notin S_p} y_i x_{ij} w_j^{t-1} \right) + \lambda^t \|w_{S_p} - w_{S_p}^{t-1}\|^2 \right\}.$$

where $S_p$ is a sub-group of $1, \ldots, D$, t is a current iteration, and L is a loss function of the binary classification.

13. The method of claim 12, wherein the slave computer includes a quantum processor.